Figure 3:
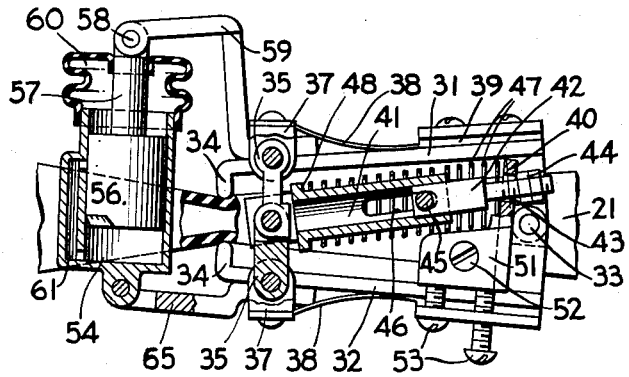

March 2, 1954  A. G. PERKINS  2,670,754
CONTROL UNIT FOR MILKING MACHINES
Filed July 23, 1951  3 Sheets-Sheet 1
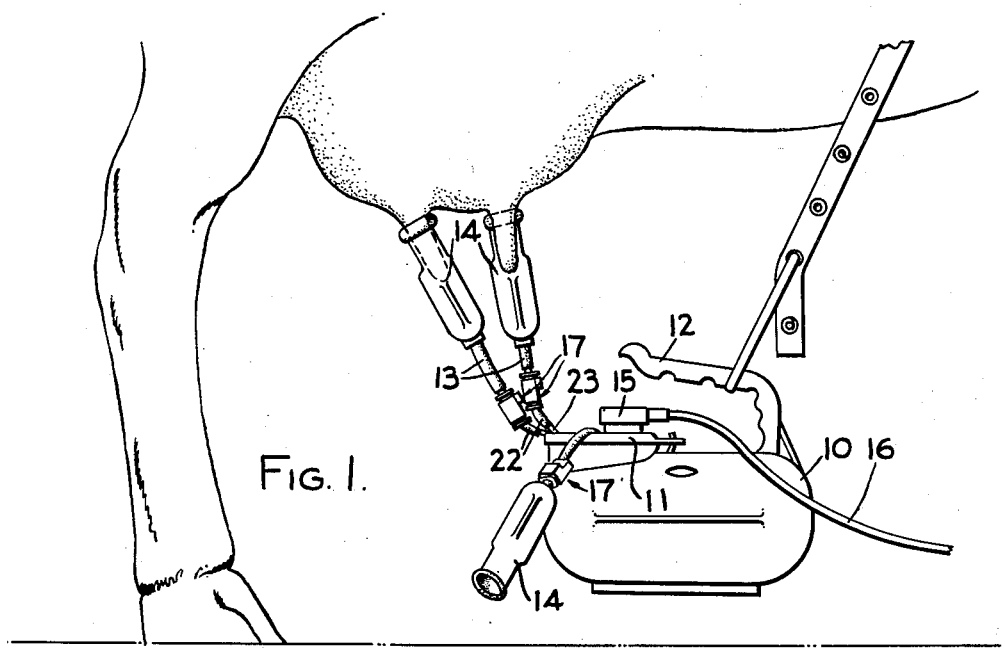
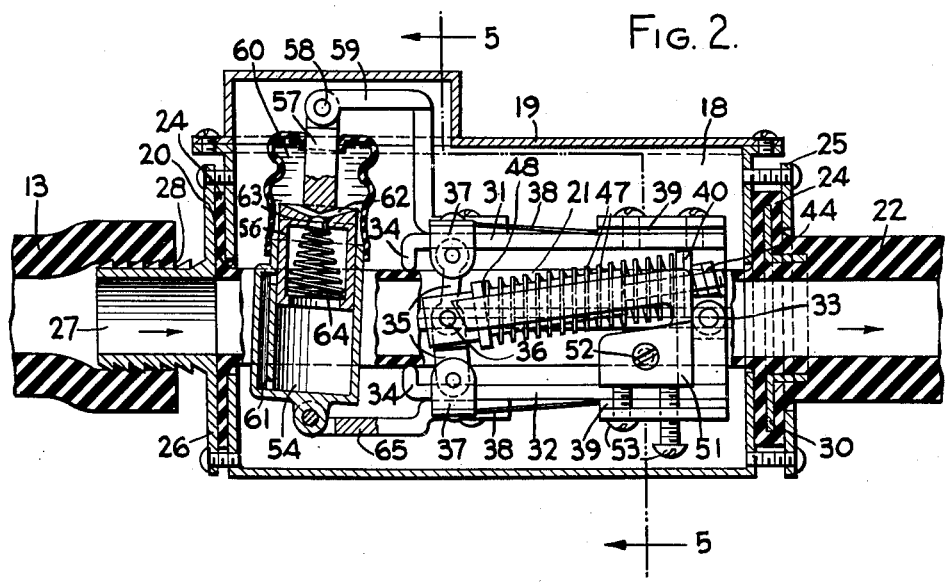
INVENTOR
Albert G. Perkins
BY Walter P. Guyer
ATTORNEY March 2, 1954     A. G. PERKINS     2,670,754
CONTROL UNIT FOR MILKING MACHINES
Filed July 23, 1951     3 Sheets-Sheet 2

INVENTOR
Albert G. Perkins
By Walter P. Guyer
ATTORNEY

March 2, 1954 A. G. PERKINS 2,670,754
CONTROL UNIT FOR MILKING MACHINES
Filed July 23, 1951 3 Sheets-Sheet 3

INVENTOR
Albert G. Perkins
By Walter P. Geyer
ATTORNEY

Patented Mar. 2, 1954

2,670,754

UNITED STATES PATENT OFFICE 2,670,754

CONTROL UNIT FOR MILKING MACHINES

Albert G. Perkins, Grand Island, N. Y.

Application July 23, 1951, Serial No. 238,104

18 Claims. (Cl. 137—455)

1

This invention relates to an automatic control for milking machines for causing the automatic dropping of the teat cups from the cow as the respective quarters of the cow's bag are milked out and thereby prevent injury to the cow when the machine is left on too long.

It has for one of its objects to provide a control unit of this character which is so designed and constructed as to automatically respond and cut off the vacuum in the milk flow connection to the teat cup when the flow of milk from the companion quarter of the cow's bag substantially ceases to thereupon cause that cup to be released and drop by gravity from the cow, and which embodies positive and effective means for releasably restraining the cutting off of the vacuum and the flow of milk through the connection until a predetermined and critical time in the milking operation has been reached.

Another object of the invention is to provide a self-contained teat cup connection control unit adapted to be interposed in such connection and having a simple and reliable milk-flow tube contracting valve-like assembly embodying fluid-controlled means for obtaining the desired time of closing of such assembly and a trip mechanism in operative correlation thereto which functions to hold the valve assembly open for the normal flow of milk during the milking operation and to releasably restrain any tendency of its complete contraction or closing to cut off the vacuum in the teat cup connection until a predetermined time, reflected by or dependent upon the condition of flow of the milk in such connection or, in other words, as such time as the flow of milk through the connection has substantially ceased and the milking period is finished.

A further object is the provision of a milk flow control and vacuum shut off unit for milking machines which is readily adjustable to suit varying milking conditions, which is easy to assemble for insertion into the teat cup connections, and which is so designed as to eliminate any contamination of the milk while flowing therethrough from the cow to the can.

Other features of the invention reside in the construction and arrangement of parts hereinafter described and particularly pointed out in the appended claims.

In the accompanying drawings:

Figure 1 is a side view of a milking machine suspended in operative relation to the cow and showing my control units interposed in the teat cup connections thereof, one of the cups having been automatically released from the cow. Fig-

Figure 4:
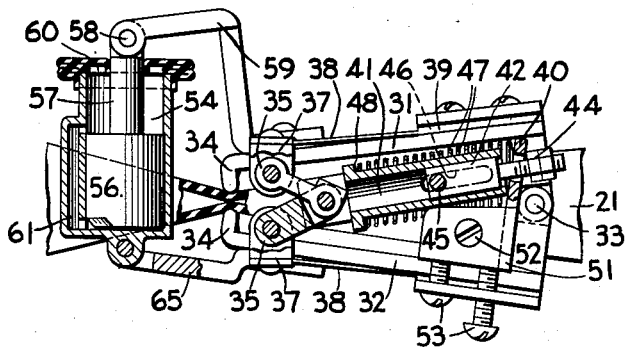
Figure 5:
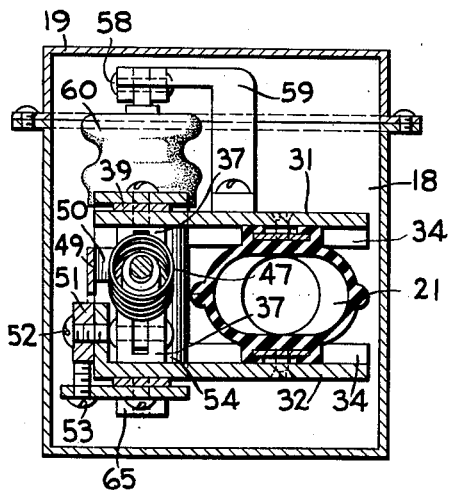
Figure 6:
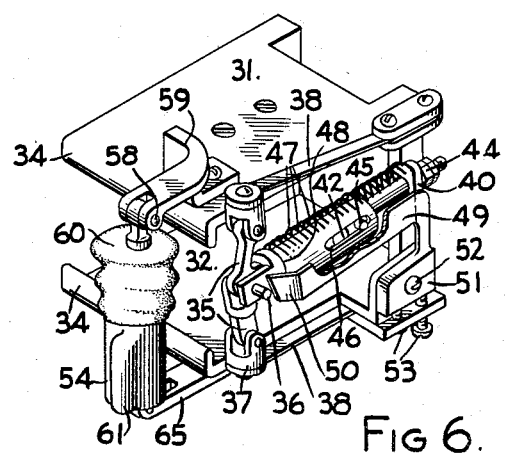
Figure 7:
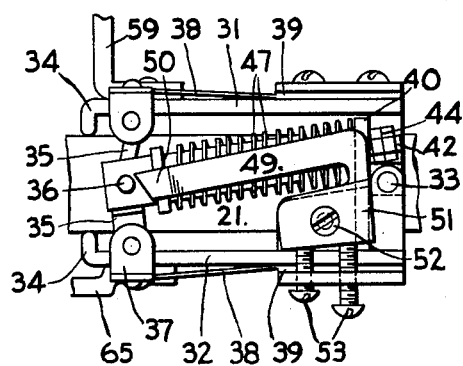
Figure 8:
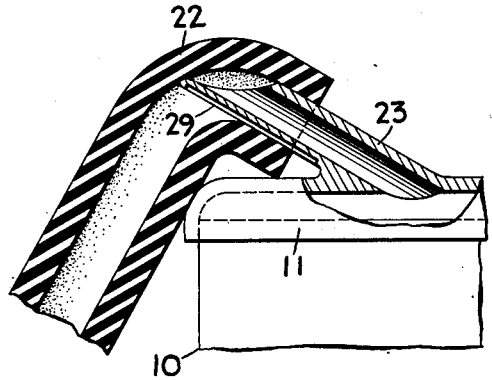
Figure 9:
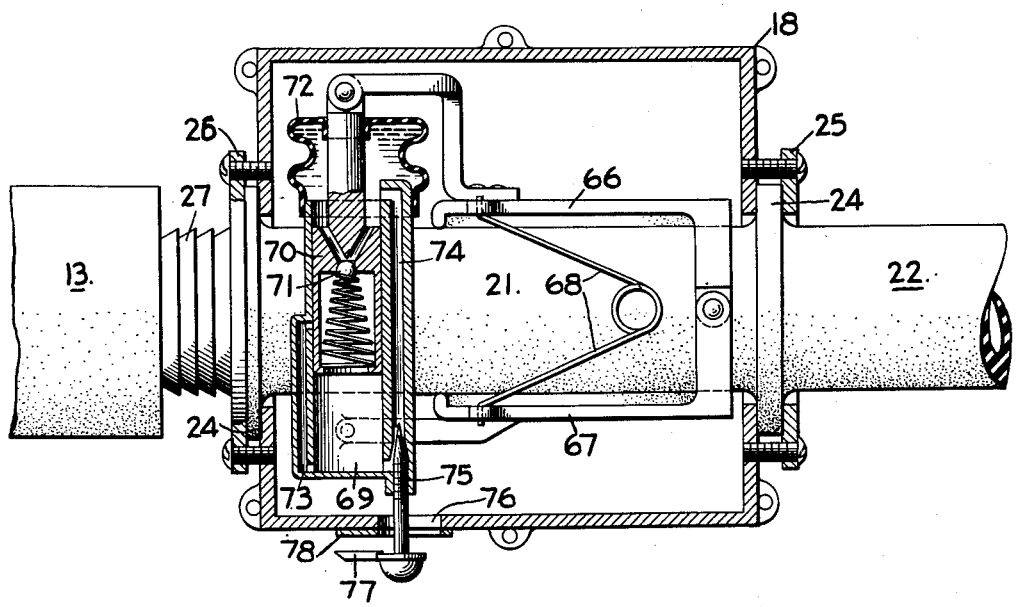

2 ure 2 is an enlarged longitudinal section of one of the devices in its milking position. Figure 3 is a similar fragmentary sectional view showing the parts in a partially contracted condition or approaching a vacuum shut off position. Figure 4 is a similar fragmentary sectional view showing the parts in their tube shut off position. Figure 5 is a cross section taken on line 5—5, Figure 2. Figure 6 is a detached perspective view of one of the control unit assemblies in its normal expanded position. Figure 7 is a side elevation of one of the control units showing the trip mechanism adjusted for a longer period of restraint against tube contraction than that shown in Figure 2. Figure 8 is an enlarged sectional detail view showing the vented position of the teat cup connection, after dropping from the cow, to the cover spout of the milking machine. Figure 9 is an enlarged longitudinal section of a modified form of the invention.

Similar characters of reference indicate corresponding parts throughout the several views.

By way of example, I have shown my teat cup dropping control device applied to a well known type of vacuum or pulsating milking machine wherein 10 indicates the milk-receiving can having a cover 11 and bail 12, the cover having the usual milk intake tubes radiating therefrom and each connected by a flexible hose or connection 13 having a teat cup 14 at its free end for detachable connection to one of the cow's teats. Also applied to the cover is the customary pulsator 15 which is connected by a hose 16 to the suction source. Interposed in each hose connection 13 is one of my control units, indicated generally by the numeral 17, through which the milk flows from the cow to the can and which functions as a valve to automatically shut off the vacuum as the companion quarter of the cow's bag is milked out and cause its teat cup to drop from the cow, as depicted in Figure 1, to effectually prevent injury to the cow from overmilking, and subsequently cause the automatic restoration of the unit to its initial position.

In its preferred construction shown in the drawings, the control unit consists of a body or casing 18 constituting a support or housing for its working parts and having a removable cover 19 at one side thereof and axially-alined openings 20 in its opposite ends. Extending through these end openings are the intake and discharge ends of a flexible, contractible tube-like conduit section or valve member 21 of rubber or like material extending lengthwise through the casing in spaced relation to its surrounding walls and disposed in interposed milk flow communication with the companion teat cup connection 13. The discharge end of this tube section has a thicker-walled extension 22 for connection to one of the cover intake tubes or spouts 23 radiating from the can-cover 11, as seen in Figure 8. At its ends, for abutting engagement with the end walls of the casing 18 about its openings 20, this contractible tube section has attaching flanges 24 for detachably securing it by clamping plates 25, 26 thereto. The clamping plate 26 has a nipple 27 formed thereon to which the discharge end of the teat cup connection 13 is connected. A capillary-like vent passage 28 is disposed between the latter and such nipple to properly vent the teat cup connection to the atmosphere after the tube section has been collapsed or contracted, as hereinafter described, to permit the teat cup to drop from the cow. A similar vent passage 29 is provided in the underside of each of the milk can intake spouts 23, as shown in Figure 8, with the tube section extension 22 encircling such spout for the purpose of properly venting the control unit to restore the collapsed tube section 21 and its associated parts to their initial position after the teat cup drops from the cow. It will be noted, in the dropped position of the released teat cup, that the top side of the tube extension closes over and seals the intake end of the spout to close off the vacuum to the control unit. The attaching flange 25 at the discharge end of the tube section 21 is preferably provided with a metallic reinforcing ring 30 embedded therein to resist any transmission of longitudinal strains to the collapsible section of the tube during the milking operation so as not to disturb or influence the same.

Applied to the diametrically opposite faces of the contractible tube section 21, for causing its uniform collapse to a transversely closed position to shut off the vacuum to the teat cup when the flow of milk from the companion quarter of the cow's bag has substantially ceased, are top and bottom plates 31, 32 hinged to each other at 33 adjacent the discharge end of the tube section in substantially the axial plane thereof and provided at their opposite or free ends with tube-engaging jaws 34 for biting into and sealing the tube section in its contracted position shown in Figure 4. A toggle-joint, trip-governing connection or safety means is interposed between the free ends of the jaw plates at one side of the collapsible tube section for the purpose of yieldingly holding the tube section open or restraining or controlling its complete collapse to its shut off position until a predetermined time in the milking operation, as when the companion quarter of the cow's bag has been milked out and not necessarily when the cow has temporarily let down on her milking. In its preferred construction, this connection consists of a pair of toggle links 35 fulcrumed at their inner ends to each other on a combined pivot and tripping pin 36 and pivoted at their outer ends to companion ears 37 applied to the free ends of opposing outwardly yieldable arms or hangers 38 fixed at 39 at one side of the pivoted ends of the companion jaw plates, as shown in Figures 2, 4 and 6. During the pulsating contraction of the tube section and its jaw plates, the yieldable arms are tensioned outwardly and tend to maintain the toggle connection taut or distended and this tension increases as the contraction is greater to restrain the complete tube-collapse under normal milking conditions and assure the proper flow of milk until such time as the toggle connection is tripped and the tube section closed, as hereinafter described. A telescoping connection is interposed between the toggle-fulcruming pin 36 and a bracket 40 rising from the adjoining pivoted end of the lower jaw plate 32, such connection including a longitudinally-slotted sleeve section 41 pivoted at one end to the toggle-fulcruming pin and a rod or plunger 42 guided therein and extended at its outer end through an opening 43 formed in the plate-bracket. The outer end of this rod has an adjustable stop nut 44 thereon which normally abuts the outer face of the bracket 40, while adjacent its inner end it has a transverse stud 45 thereon engaging the slotted portion 46 of the sleeve section 41. A light coil spring 47 is disposed about this telescoping connection and abuts at one end against the inner face of the bracket 40 and at its other end against a flange or shoulder 48 formed on the sleeve portion 41 of the connection, as clearly shown in Figure 3. This spring serves to normally urge the toggle links 35 to their cocked or untripped position, shown in Figures 2 and 6, and the telescoping connection 41, 42 provides for the relative overtravel so that no disturbing resistance is presented by that spring to the contraction of the toggle connection in response to the collapse of the tube section 21 when the flow of milk therethrough substantially ceases.

The toggle pivot-pin 36 also serves as a trip element of a mechanical interlock for restraining the inward-folding or contraction of the toggle connection until a predetermined displacement of movement of the jaw-plates 31, 32 and the opposing toggle-connected spring arms 38 has been reached. For this purpose a laterally flexible tappet or latching bar 49 is mounted for adjustable movement on the plate-bearing bracket 40 in substantially adjoining paralleling relation to the telescoping connection 41, 42, 47 with its free or inwardly-bent tip end 50 disposed in edgewise relation to and adapted for abutting contact with the toggle pivot pin 36, as shown in Figure 2, to hold the toggle against being tripped to a contracting position until the displacement of the tube-bearing jaw-plates is such that the tip end of the tappet bar travels past and clears the pivot-pin. Subsequent to the contraction of the toggle connection by the vacuum collapsing of the tube section 21 and upon its unfolding to its expanded position by the venting of such tube section, the trip pin 36 rides under the then overlying latching bar 49, the latter being free to flex laterally outward for that purpose and then springing inwardly to its initial position in operative edgewise relation to the side of such pin. This tappet or latching bar may be in the form of an extension applied to an attaching plate 51 pivoted at 52 to the bracket 40, such plate being vertically adjustable about its pivot by screws 53 disposed at opposite sides of such pivot and in bearing contact with the lower edge of the plate, as shown in Figures 2 and 6. By adjusting these screws, the tappet bar can be set precisely where desired in transverse relation to the trip pin 36 to shorten or lengthen the path of arcuate travel of this bar before its tip end 50 rides off or is released from the trip pin. In Figure 7, for example, I have shown the tappet bar adjusted for a longer tripping stroke than that shown in Figure 2. As shown in Figure 2, the trip pin is normally spaced somewhat from the opposing edge of the tappet bar 49 to eliminate objectional initial friction between these parts and this spacing may be varied as desired by adjusting the stop nut 44 on the telescoping connecting rod 42 accordingly. In practise this adjustment is so set that the trip pin does not make contact with the edge of the tappet bar until the tube section has been contracted to a position approaching that of its closed position.

Operatively interposed between the free ends of the jaw-plates 31, 32 and at one side of the collapsible tube section 21 is a fluid or hydraulic control assembly for time-governing the contraction of the tube section in such a manner that its initial contraction to a partial closing resulting from a change of vacuum therein during the milking operation is a comparatively slow or gradual one while its final contraction to effect the complete collapse and closing of such tube section is a prompt and quick action. By preference, this fluid control assembly consists of a cylinder 54 open at its upper end and pivotally supported or trunnioned adjacent its closed lower end for pivotal displacement on a bracket 65 projecting from the free end of the lower jaw plate 32, and a plunger 56 operating in the cylinder and having a stem 57 rising therefrom pivotally connected at 58 to a bracket 59 projecting from the free end of the companion or upper jaw-plate 31. Communicating with the open end of the cylinder is a flexible-walled boot or contractible fluid reservoir 60 of rubber or like material in fluid sealed connection at one end to the cylinder and in like sealed connection at its other end to the stem of the plunger, as shown in Figure 2. The cylinder has a longitudinal fluid port or passage 61 in its side which opens at its upper and lower ends into the cylinder with the upper end thereof opening below the upper end of the latter and covered by the plunger during normal milking operations. The reservoir and the communicating cylinder, above and below the plunger, are substantially fitted with a constant viscosity fluid and the fit of the plunger in the cylinder is such that a capillary flow of the fluid takes place about the plunger during the fluctuating or contracting and expanding movements of the jaw-plates in response to like movements of the tube section during the milking operation. The plunger 56 is recessed at its lower end and its head has one or more ports 62 therein opening into the reservoir 60 and cylinder and normally closed by a downwardly-opening fluid pressure release or check valve 63 backed up by a coil spring 64 arranged in the plunger-recess. The distance between the upper and lower ends of the passage 61, where they intersect or open into the cylinder, is such that as the plunger approaches a position short of the bottom of the cylinder the upper end of such passage is uncovered by the plunger and for the balance of the downstroke the fluid passes or circulates freely through said passage from the bottom to the top of the cylinder with the result that the balance of the plunger stroke is a quick one to permit a prompt final closing of the tube section 21 to its vacuum shut off position. Upon the expansion of the tube section and the jaw-plates, which takes place when the companion teat cup 14 drops from the cow, the cylinder and piston are correspondingly moved outwardly relatively to each other to impart an upstroke to the piston which results in an opening of the check valve 63 by the fluid pressure to effect the proper displacement of the fluid from the upper to the lower end of the cylinder and restore the assembly to its initial position. This fluid control assembly has the advantage of providing a reliable sensitive and positive means for governing the fluctuating or contracting and expanding action of the tube section 21 during surges of milk therethrough and timing its collapse to a closed position when the cow is milked out, as as well as a means which is prompt to respond to such action and wherein its fluid medium is completely isolated from the tube section to effectually eliminate any danger of milk contamination as it flows from the cow to the can.

In Figure 9 I have shown a modified form of the invention designed for governing the gradual and continuing collapse of the tube section 21 to its vacuum shut off position upon the lapse of a predetermined time period as distinguished from the previously described construction which is dependent upon the companion quarter of the cow's bag being substantially milked out before the tube section is shut off. In this form of the invention, the collapsible tube section is disposed in the casing 18 as before, and the hinged jaw plates 66 and 67 are attached to the top and bottom walls of such tube section with a light spring 68 interposed therebetween for facilitating their movement to an expanded position. The hydraulic control assembly for governing the collapse of the tube section is substantially the same as that shown in Figure 2, the same consisting of the cylinder 69, the plunger 70 with its downwardly-opening check valve 71 and the flexible-walled fluid reservoir 72. At one side thereof the cylinder has a longitudinal fluid passage 73 which opens at its upper and lower ends into the same with the upper end thereof covered by the plunger during normal milking operations. A second fluid passage 74 is formed in the side of the cylinder which opens at its upper end into the reservoir above the plunger in its upstroke position and at its lower end into the bottom of the cylinder. Disposed in operative controlling relation to the conical-shaped lower end of this second passage 74 is an adjustable needle valve 75 for selectively governing the constant flow of the fluid from the lower end of the cylinder into the reservoir, and the timing of collapse of the tube section toward its shut off position. As the plunger approaches the lower end of its down-stroke, the companion passage 73 is uncovered thereby, as in the previous construction, and this results in the final and prompt collapse of the tube section to its shut off position. The control end of the needle valve extends freely through an opening 76 in the casing 18 and it is fitted with a pointer 77 traversing a time-calibrated dial 78 disposed about such opening, the dial being calibrated in, say, minutes, for setting the needle valve to the time setting desired for a given milking operation.

I claim as my invention:

1. In a control unit of the character described, means including a collapsible tube section adapted for interposition in a conduit for conducting liquid by vacuum from a source of supply to a receiving container, means applied to diametrically opposite sides of said tube section for releasable contraction about the same to a closed flow-sealing position, brackets projecting from said contraction means at one side of the tube section, fluid-governed cylinder and plunger elements operatively interposed between and each movably-joined at one end to said companion brackets and having intercommunicating fluid-controlling ports therein, and a flexible-walled fluid reservoir disposed in operative communication with said cylinder and plunger elements.

2. In a control unit of the character described, means including a collapsible tube section adapted for interposition in a conduit for conducting liquid by vacuum from a source of supply to a receiving container and to be collapsed by the vacuum when the flow of liquid therethrough substantially ceases, plates secured to diametrically opposite sides of said tube section to move as a unit therewith and in hinged relation at one end transversely thereof and having opposing jaws at its opposite ends for releasable contractible engagement with the tube section to a closed flow-sealing position, fluid-governed cylinder and plunger elements operatively interposed between and each pivotally joined at one end to the jaw ends of said plates at one side of the tube section and having intercommunicating fluid-controlling ports therein, a flexible-walled fluid reservoir disposed in operative fluid communication, with and secured at its opposite ends jointly to the companion adjoining ends of said cylinder and plunger elements, and outwardly-tensioned trip-governed latching means operatively interposed between said plates for restraining the collapse of the tube section under normal flow conditions.

3. In a control unit of the character described, means including a collapsible tube section adapted for interposition in a conduit for conducting liquid by vacuum from a source of supply to a receiving container, means applied to diametrically opposite sides of said tube section for releasable contraction about the same to a closed flow-sealing position, and a fluid control assembly operatively interposed between said contraction means for governing the collapse of the tube section and including a cylinder and plunger joined in opposing operative relation to such contraction means and a flexible-walled fluid reservoir disposed in communicating relation about the upper ends of the cylinder and the plunger, the cylinder having a fluid passage opening into the same and normally closed at one end by the plunger but adapted to be uncovered by the latter at a predetermined time during the collapse of the tube section, the plunger having a normally closed valved port therein adapted to open upon the expanding movements of the contraction means.

4. In a control unit of the character described, means including a collapsible tube section adapted for interposition in a conduit for conducting liquid by vacuum from a source of supply to a receiving container, means applied to said tube section in hinged relation at one end transversely thereof and including opposing jaw-like members for releasable contractible engagement with the tube section, opposing cylinder and plunger elements interposed for relative movement between said jaw-like members for the capillary flow of fluid about the plunger; the cylinder being open at one end and the plunger having a connecting rod rising from its corresponding end; a flexible-walled fluid reservoir in communication with the open end of the cylinder and joined at one end thereto and at its other end to the plunger-rod, said plunger having a normally-closed valved port therein adapted to open upon the expanding movement of the tube section to cause a displacement of the fluid from said reservoir into the cylinder below the plunger, and said cylinder having a normally-closed fluid circulating passage therein governed by and adapted to be uncovered by the plunger upon the final stage of contraction of the tube section to its closed position.

5. A control device of the character described, comprising a body having a contractible tube section extending therethrough and adapted for connection to a conduit for conducting liquid by vacuum from a source of supply to a receiving container and to be collapsed to a closed position by the vacuum when the flow of liquid therethrough substantially ceases, means applied to diametrically opposite sides of said tube section in hinged relation at one end transversely thereof and having opposing jaws at its opposite ends for releasable contractible engagement with the tube section, a pair of toggle links interposed between said hinge means and yieldingly supported at their outer ends thereon for outward displacement relative thereto, and a latching means connected to said hinge means to move therewith in operative release-governing relation to said links to normally restrain their contraction and the complete contraction of the tube section until a predetermined time in the liquid flow operation.

6. A control device of the character described, comprising a body having a contractible tube section extending therethrough and adapted for connection to a conduit for conducting liquid by vacuum from a source of supply to a receiving container and to be collapsed to a closed position by the vacuum when the flow of liquid therethrough substantially ceases, means applied to diametrically opposite sides of said tube section in hinged relation at one end transversely thereof and having opposing jaws at its opposite ends for releasable contractible engagement with the tube section, a pair of toggle links including a pivot-tripping pin interposed between said hinge means and yieldingly supported at their outer ends thereon for outward displacement relative thereto, and a latching element connected at one end to said hinge means to move therewith in edgewise traversing relation at its opposite end to said tripping pin to normally restrain a contraction of said toggle links and the complete contraction of the tube section until a predetermined time in the liquid flow operation.

7. A control device of the character described, comprising a body having a contractible tube section extending therethrough and adapted for connection to a conduit for conducting liquid by vacuum from a source of supply to a receiving container and to be collapsed to a closed position by the vacuum when the flow of liquid therethrough substantially ceases, means applied to diametrically opposite sides of said tube section in hinged relation at one end transversely thereof and having opposing jaws at its opposite ends for releasable contractible engagement with the tube section, a pair of toggle links including a pivot-tripping pin interposed between said hinge means and yieldingly supported at their outer ends thereon for outward displacement relative thereto, a latching element connected at one end to said hinge means to move therewith in edgewise traversing relation at its opposite end to said tripping pin to normally restrain a contraction of said toggle links and the complete contraction of the tube section until a predetermined time in the liquid flow operation, and means for adjusting said latching element to bring its pin-engaging edge in one or another of a plurality of positions in relation to the pivot-tripping pin.

8. A control device of the character described, comprising a body having a contractible tube section extending therethrough and adapted for connection to a conduit for conducting liquid by vacuum from a source of supply to a receiving container and to be collapsed to a closed position by the vacuum when the flow of liquid therethrough substantially ceases, means applied to diametrically opposite sides of said tube section in hinged relation at one end transversely thereof and having opposing jaws at its opposite ends for releasable contractible engagement with the tube section, a pair of toggle links interposed between said hinge means and yieldingly supported at their outer ends thereon for outward displacement relative thereto, a displaceable yieldable connection joined at one end adjacent the hinged end of said hinge means and at its other end to the pivot-tripping pin, and a latching element connected at one end to said hinge means to move therewith in traversing relation at its opposite end to said tripping pin.

9. A control device of the character described, comprising a body having a contractible tube section extending therethrough and adapted for connection to a conduit for conducting liquid by vacuum from a source of supply to a receiving container and to be collapsed to a closed position by the vacuum when the flow of liquid therethrough substantially ceases, means applied to diametrically opposite sides of said tube section in hinged relation at one end transversely thereof and having opposing jaws at its opposite ends for releasable contractible engagement with the tube section, a pair of toggle links including a pivot-tripping pin interposed between said hinge means and yieldingly supported at their outer ends thereon for outward displacement relative thereto, a latching element connected at one end to said hinge means to move therewith in edgewise traversing relation at its opposite end to said tripping pin to normally restrain a contraction of said toggle links and the complete contraction of the tube section until a predetermined time in the liquid flow operation, and fluid-governed means operatively interposed between said hinged means for movement therewith for regulating the speed of contraction of the tube section to its closed position.

10. In a control unit of the character described, means including a collapsible tube section adapted for interposition in a conduit for conducting liquid by vacuum from a source of supply to a receiving container, means applied to diametrically opposite sides of said tube section for releasable contraction about the same to a closed flow-sealing position, fluid-governed cylinder and plunger elements operatively interposed between said contraction means for the capillary flow of fluid about the plunger and having intercommunicating fluid-controlling ports therein, and a fluid reservoir disposed in operative communicating relation with said cylinder and plunger, one of the ports being normally closed by the plunger and adapted to be uncovered by the latter at a predetermined time during the collapse of the tube section, another of the ports including a normally closed valve adapted to open upon the expansion of the tube section, and the remaining port establishing constant communication between the reservoir and the lower end of the cylinder and having an adjustable control valve therefor.

11. In a control unit of the character described, means including a collapsible tube section adapted for interposition in a conduit for conducting liquid by vacuum from a source of supply to a receiving container and to be collapsed to a closed position by the vacuum when the flow of liquid therethrough substantially ceases, means in substantially embracing relation with said tube section to move therewith in response to the variation in vacuum therein and contractible about such section to a closed position when the surge of liquid therethrough substantially ceases, means operatively connected to said embracing means including a trip latching mechanism for restraining the complete contraction of the tube section during normal flow conditions and adapted to be released under reduced flow conditions to permit the contraction of the tube section to its closed position, and fluid-governed means operatively interposed between said embracing means for controlling the gradual restrained contraction of the tube section during normal flow conditions and for governing the prompt and quick contraction of such tube section to its closed position upon the release of said trip mechanism.

12. In a control unit of the character described, means including a collapsible tube section adapted for interposition in a conduit for conducting liquid by vacuum from a source of supply to a receiving container and to be collapsed to a closed position by the vacuum when the flow of liquid therethrough substantially ceases, jaw-like plates secured to diametrically opposite sides of said tube section to move therewith and in hinged relation at one end to each other and terminating at their free ends in tube-engaging jaws, a fluid control assembly operatively interposed between the free ends of said plates at one side of the tube section for governing the time contraction of the tube section, a yieldingly suspended toggle joint connection releasably interposed between said plates for normally restraining the action of the fluid control assembly in governing the contraction of the tube section to its closed position, and a trip-governing means in operative relation to said toggle connection for governing its release at a predetermined time in the collapsing movement of the tube section.

13. A control device of the character described, comprising a body having a contractible tube section extending therethrough and adapted for connection to a conduit for conducting liquid by vacuum from a source of supply to a receiving container and to be collapsed to a closed position by the vacuum when the flow of liquid therethrough substantially ceases, means applied to diametrically opposite sides of said tube section in hinged relation at one end transversely thereof and having opposing jaws at its opposite ends for releasable contractible engagement with the tube section, a pair of toggle links interposed between said hinge means and yieldingly supported at their outer ends thereon for outward displacement relative thereto, a latching means connected to said hinge means to move therewith in operative release-governing relation to said toggle links to normally restrain their contraction and the complete contraction of the tube section until a predetermined time in the liquid flow operation, and fluid-governed means operatively interposed between said hinged means for movement therewith for regulating the speed of contraction of the tube section to its closed position.

14. In a control unit of the character described, means including a flexible contractible tube section adapted for interposition in a conduit for conducting liquid by vacuum from a source of supply to a receiving container, means in substantially embracing relation with said tube section to move as a unit therewith and for releasable contraction about the same to a closed flow-sealing position, a fluid control assembly operatively interposed between said embracing means for governing the contraction of the tube section, and a trip-governing means operatively connected to said embracing means for yieldingly holding the tube section open and for releasably restraining the action of the fluid control assembly in governing the complete contraction of the tube section to its closed position.

15. A control device of the character described, comprising a body including a flexible contractible tube section supported thereon and adapted for interposition in a conduit for conducting liquid by vacuum from a source of supply to a receiving container, means in substantially embracing relation with said tube section to move therewith in response to the variation in vacuum therein and for releasable contraction about such section to a closed flow-sealing position, and a trip-latching means in operative relation to said embracing means for releasably restraining the complete contraction of the tube section during normal flow operations and adapted for release to an unlatched position when the tube section and its embracing means reach a predetermined closed position, consisting of a toggle-like connection interposed between and yieldingly supported at one end on said embracing means for outward tensioned displacement relative thereto and having a trip element thereon, and a tappet applied to said embracing means in releasable latching relation to said trip element.

16. A control device of the character described, comprising a body having a contractible tube section extending therethrough and adapted for connection to a conduit for conducting liquid by vacuum from a source of supply to a receiving container and to be collapsed to a closed position by the vacuum when the flow of liquid therethrough substantially ceases, means applied to diametrically opposite sides of said tube section in hinged relation at one end transversely thereof and having opposing jaws at its opposite ends for releasable contractible engagement with the tube section, a pair of toggle links interposed between said hinge means and yieldingly supported at their outer ends thereon for outward displacement relative thereto, a latching means connected to said hinge means to move therewith in operative release-governing relation to said links to normally restrain their contraction and the complete contraction of the tube section until a predetermined time in the liquid flow operation, and fluid-governed means operatively interposed between said hinged means for movement therewith for regulating the speed of contraction of the tube section to its closed position.

17. A control device of the character described, comprising a body having a contractible tube section extending therethrough and adapted for connection to a conduit for conducting liquid by vacuum from a source of supply to a receiving container and to be collapsed to a closed position by the vacuum when the flow of liquid therethrough substantially ceases, means for preventing the complete vacuum collapse of the tube section until the flow of liquid substantially ceases including a flexible outwardly-tensioned connection in operative relation to said tube section for releasably restraining its complete contraction during normal liquid flow operations, a trip-governing means in operative relation to said connection for governing its release at a predetermined time in the collapsing movement of the tube section, and means correlated with said connection for regulating the speed of contraction of the tube section.

18. In a control unit of the character described, means including a collapsible tube section adapted for interposition in a conduit for conducting liquid by vacuum from a source of supply to a receiving container and to be collapsed by the vacuum when the flow of liquid therethrough substantially ceases, plates secured to diametrically opposite sides of said tube section to move as a unit therewith and in hinged relation at one end transversely thereof and having opposing jaws at its opposite ends for releasable contractible engagement with the tube section to a closed flow-sealing position, opposing outwardly-yieldable arms fixed at one end adjacent the hinged ends of said plates, a toggle-like connection interposed between the free ends of said arms, and a latching means connected to one of said hinge plates to move therewith and in operative release-governing relation to said toggle-like connection to normally restrain its contraction and the complete contraction of the tube section until a predetermined time in the liquid flow operation.

ALBERT G. PERKINS.

References Cited in the file of this patent

UNITED STATES PATENTS

| Number | Name | Date |
|---|---|---|
| 2,558,152 | Perkins | June 26, 1951 |
| 2,572,658 | Perkins | Oct. 23, 1951 |
| 2,600,493 | Farris | June 17, 1952 |
| 2,614,530 | Perkins | Oct. 21, 1952 |
| 2,615,423 | Perkins | Oct. 28, 1952 |

FOREIGN PATENTS

| Number | Country | Date |
|---|---|---|
| 13,127 | Great Britain | 1890 |
| 107,315 | Germany | 1899 |